July 10, 1951     W. E. OVERTURF     2,559,829
GEARING FOR MATERIAL LOADING APPARATUS
Filed March 7, 1947     2 Sheets-Sheet 1
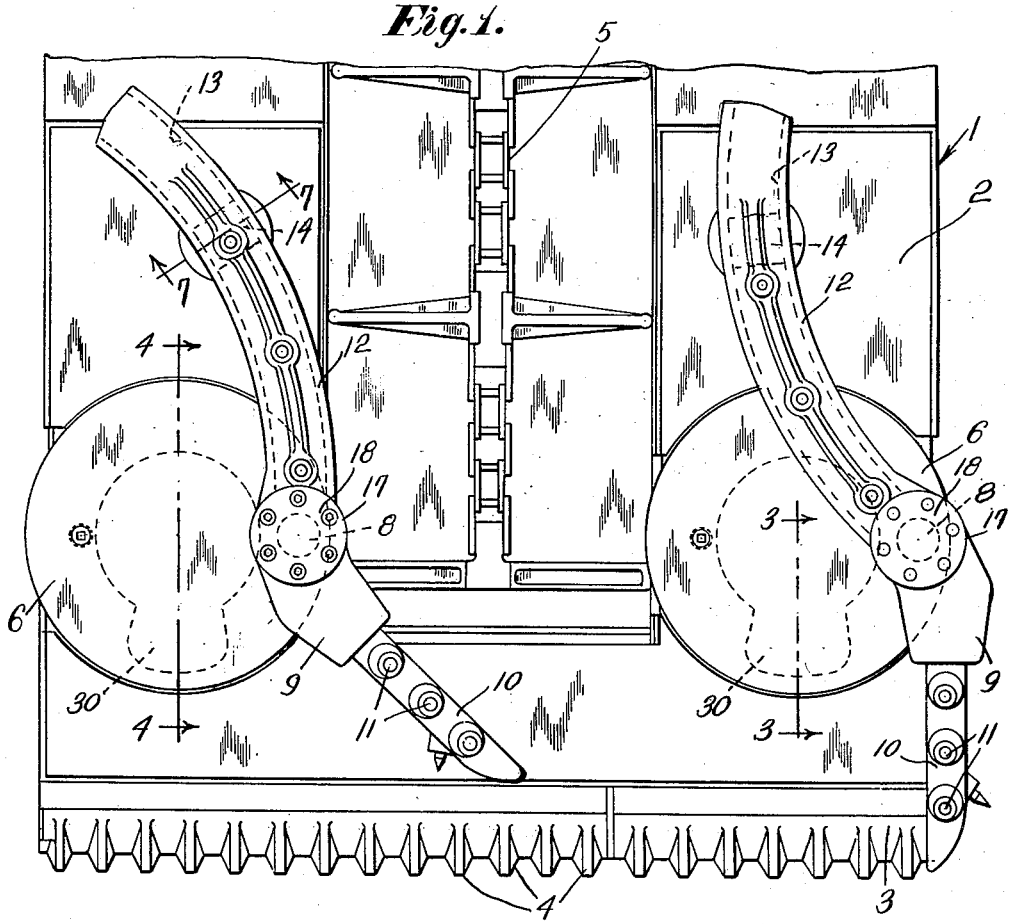
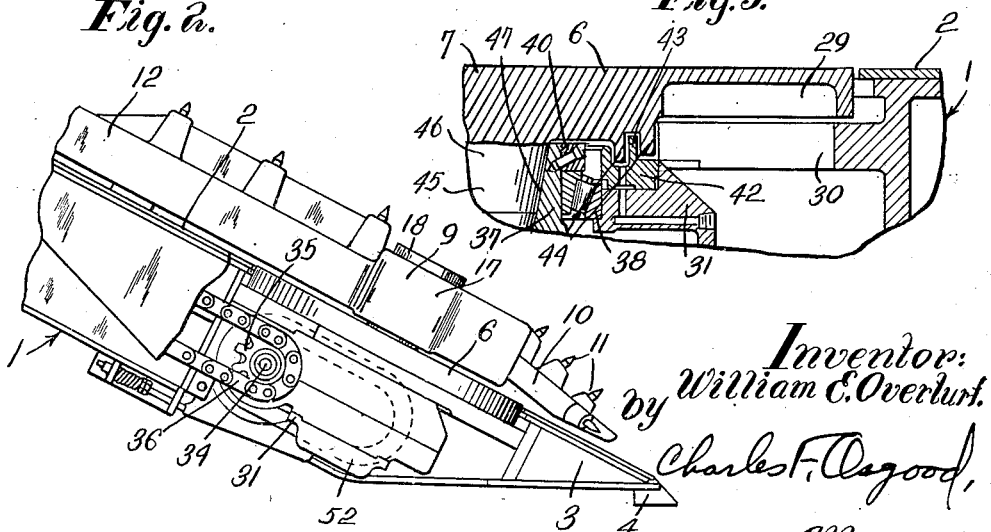
Inventor:
William E. Overturf,
by Charles F. Osgood,
Attorney.

July 10, 1951 W. E. OVERTURF 2,559,829
GEARING FOR MATERIAL LOADING APPARATUS
Filed March 7, 1947 2 Sheets-Sheet 2
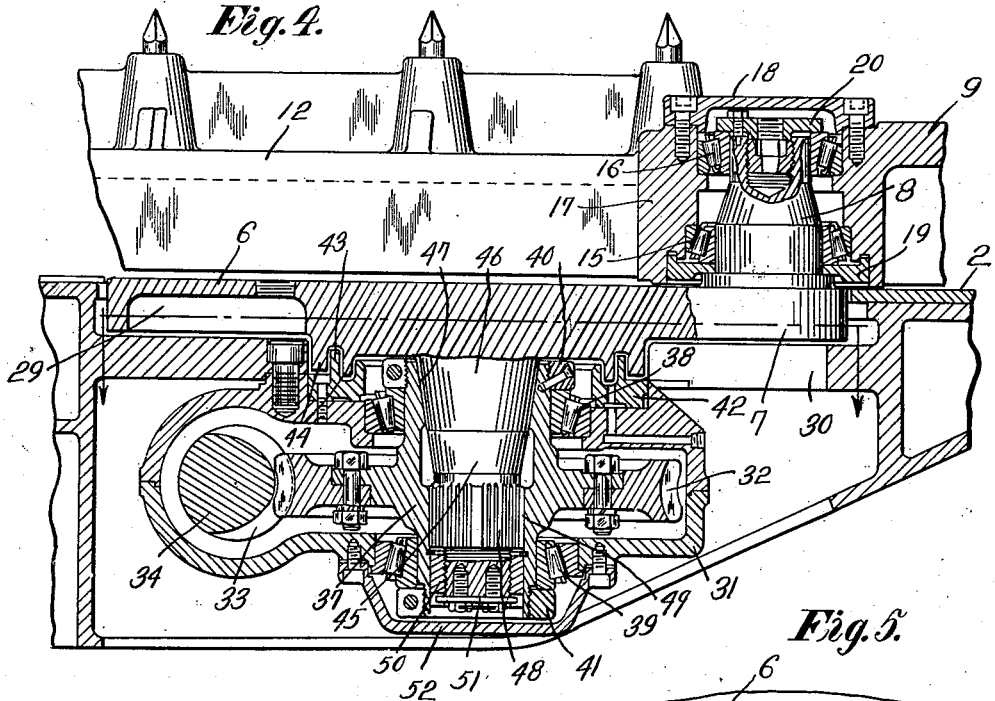
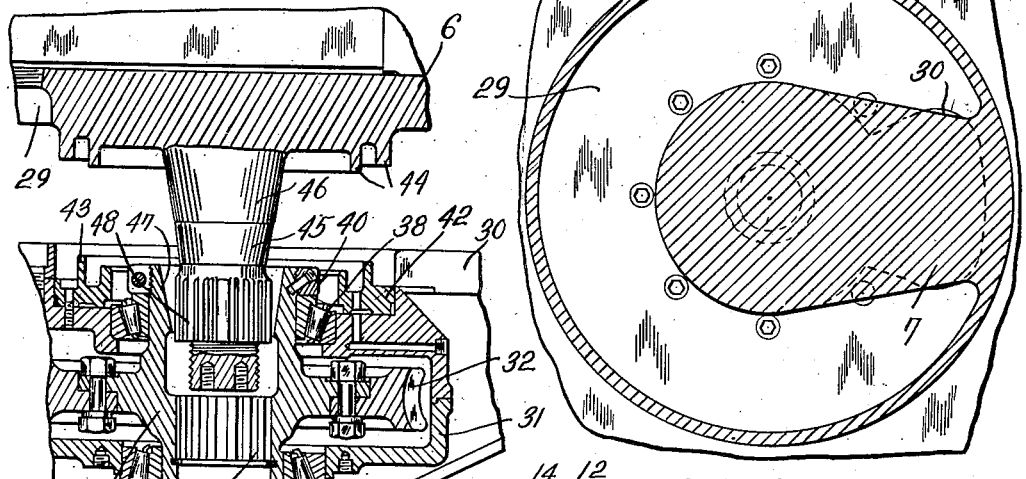
Inventor:
William E. Overturf.
by Charles F. Osgood,
Attorney.

Patented July 10, 1951

2,559,829

UNITED STATES PATENT OFFICE 2,559,829

GEARING FOR MATERIAL LOADING APPARATUS

William E. Overturf, Washington, Pa., assignor to Joy Manufacturing Company, a corporation of Pennsylvania Application March 7, 1947, Serial No. 732,958

12 Claims. (Cl. 74—425)

This invention relates to material loading apparatus and more particularly to an improved material gathering mechanism for an apparatus for loading coal or similar material in mines.

In material loading apparatus, and more particularly in mobile coal loading machines designed for use in mines, the loose coal or similar material is moved onto the loading conveyor by means of swingable gathering arms driven by cranks or disks arranged flush with the top deck of the gathering head. Such arm driving disks have bottom shafts extending axially thereof and driven by gearing arranged in gear cases secured to the gathering head beneath the head-deck. In such known constructions, considerable difficulty has been encountered in assembling and dismantling the driving disks due to the structure of the bearing mountings for the disk-shafts and driving gears wherein certain of the bearings were supported on and carried by the disk-shafts. Since the shaft bearings were supported by relatively movable parts, not only was assembly made difficult but also proper adjustment of the shaft bearings was difficult to attain.

The present invention, from a broad aspect, contemplates an improvement in a bearing mounting for a disk-shaft so that the crank disk may be readily dismantled without disturbing its bearing mounting in a supporting frame. From a more specific aspect, the present invention contemplates an improved bearing mounting structure for the driving gears in the gear casings so that the disk-shafts may be readily removed from their supported position in the driving gear hubs without disturbing the bearing mountings for the driving gears, thereby greatly reducing the time consumed in the dismantling and reassembling of the crank-disk structure.

It is accordingly an object of the present invention to provide an improved drive structure for the gathering mechanism of a material loading apparatus. Another object is to provide an improved bearing mounting structure for the driving gears for the gathering head disks of a loading apparatus whereby the disks may be readily dismantled and reassembled. A further object is to provide an improved bearing mounting structure for the driving gears of the crank disk-shafts whereby the disk-shafts may be readily removed from supported position in the driving gears without disturbing the bearing mountings of the latter on the gathering head. Yet another object is to provide an improved bearing mounting for the disk driving gears whereby the disk-shafts may be readily withdrawn from supported position in the gear hubs without disturbing the bearing mountings for the driving gears. A still further object is to provide an improved driving gearing for the driving disks for the gathering arms of a coal loading machine whereby the time consumed in the replacement of the driving disks and in the reassembly thereof is materially reduced. These and other objects and advantages of the invention will, however, hereinafter more fully appear.

In the accompanying drawings there is shown for purposes of illustration one form which the invention may assume in practice.

In these drawings:

Fig. 1 is a top plan view of a gathering head of a coal loading machine in which an illustrative form of the invention is embodied.

Fig. 2 is a fragmentary side elevational view of the gathering head shown in Fig. 1, with part of the outer casing broken away to show structural details.

Fig. 3 is an enlarged detail vertical sectional view taken on line 3—3 of Fig. 1.

Fig. 4 is an enlarged vertical sectional view taken substantially on line 4—4 of Fig. 1, but with the crank pin turned through 90° into its forward position, showing details of the crank pin and arm structure.

Fig. 5 is a horizontal sectional view, on a reduced scale, taken on line 5—5 of Fig. 4, showing the disk-crank portion and bottom disk cavity.

Fig. 6 is a vertical sectional view taken on the plane of Fig. 4, with parts in dismantled position.

Fig. 7 is a detail vertical sectional view taken on line 7—7 of Fig. 1, showing a guide block mounting.

In this illustrative embodiment of the invention, there is shown a gathering head generally designated 1 of a mobile loading machine of the frontal attack type for loading coal or similar material from the floor of a mine. The gathering head is normally disposed in a downwardly inclined position, as shown in Fig. 2, during the loading operation and has an inclined top deck 2 and a forward penetrating nose 3 provided with a series of toothlike projections or serrations 4 across its front penetrating edge. Arranged centrally and longitudinally of the gathering head is a conventional endless loading conveyor 5 for moving material rearwardly of the head, while arranged at the opposite sides of the front receiving end of the conveyor are flat circular plates or disks 6, 6 of identical construction having their upper surfaces lying substantially flush with the top surface of the head-deck, with their axes arranged at right angles to the plane top surface of the deck. These disks have integral crank portions 7, 7 formed with upstanding crank pins 8, 8 herein located 180° apart with respect to the disk-axes and to which swingable gathering arms 9 are pivotally connected. These gathering arms have forwardly projecting picks or claws 10, 10 lying above the head-nose 3 close to the deck surface and armed with picks or teeth 11. The gathering arms have curved guide bar portions 12, 12, likewise armed with picks or teeth, projecting rearwardly from the arm pivots and formed with downwardly opening arcuate slots 13 which receive pivoted guide blocks 14. These curved guide bars and guide blocks serve to compel movement of the gathering arms in predetermined paths as the crank disks are rotated so that the gathering arms gather the material and move the material rearwardly along the top of the head-nose 3 toward the receiving end of the loading conveyor 5. As clearly shown shown in Fig. 4, each crank pin 8 supports thrust type roller bearings 15 and 16, the former supported by the crank pin close to the top of the disk and the latter supported by the reduced upper end of the crank pin, as shown. These bearings are enclosed in a hublike portion 17 of each gathering arm, provided with a detachable cap 18. A suitable retainer ring 19 is supported at the bottom of the crank pin beneath the roller bearing 15 and fits within the bottom bore of the arm-hub 17 and is formed with a peripheral, upstanding flange fitted in a circular recess in the arm-hub, thereby to provide a dirt seal. A washer 20 is secured to the upper end of the shaft and is supported centrally therein and engages the inner race of the upper bearing for holding the bearings and arm-hub in place on the crank pin. As shown in Fig. 7, each guide block 14 engaging the arcuate guideway of the arm guide bar 12 is fixed to an upstanding shaft 21 journaled in thrust type roller bearings 22 and 23 supported within a bottom bearing support 24 secured to the gathering head beneath the head-deck. A retaining ring 25 is arranged between an upper collar on the shaft and the inner race of the upper bearing 22 and cooperates with a ring 26 positioned within an upper bore of the bearing support 24 and suitably held in position by a snap ring. These coacting rings 25 and 26 have cooperating, overlapping annular flanges to prevent access of dirt to the bearings. A bottom retaining ring 27 is positioned in the bottom bore of the bearing support 24 and is likewise suitably held in position by a snap ring. A washer 28 is secured to the lower end of the shaft 21 and engages the inner race of the roller bearing 23 to hold the shaft in position in its bearing support.

To prevent the packing of dirt or other material between the bottom surfaces of the crank disks and the adjacent underlying surfaces of the gathering head, the bottom of each disk is hollowed out at 29 all around except beneath the crank portion 7, and the cavity provided by this hollowed-out portion is adapted to receive the material which passes beneath the disk. The underlying surface of the head is cut away at 30 so that as the disk cavity passes over the opening so provided, the dirt therein may be thrown out and may drop down through the open bottom of the gathering head. Thus undesired packing of dirt or other material beneath the disks is avoided. The means for preventing clogging of the disks is fully disclosed in a copending application to C. F. Ball, Ser. No. 733,007, filed March 7, 1947, now Patent No. 2,542,977.

Now referring to the improved driving means for the gathering mechanism, it will be noted that attached to portions of the gathering head beneath the head-deck are gear casings 31, each housing a worm wheel 32 driven by a worm 33. The worm gearing for each crank disk has its worm fixed to a transverse shaft 34 suitably journaled within bearings supported within the gear casings. Each worm shaft has a sprocket 35 secured thereto, and each sprocket is driven by a drive chain 36 in any suitable and known manner. Each worm wheel 32 has an elongated hollow hub 37 journaled in thrust type roller bearings 38 and 39 supported within the gear casing. Collars 40 and 41 are threaded on the upper and low ends respectively of the gear hub 37 and respectively engage the inner races of the upper and lower bearings 38 and 39 to retain the gear hub in position on its bearings. An annular member 42 is secured, as by screws, to the upper side of the gear casing and has an upstanding annular flange 43 received in an annular recess formed between depending annular flanges 44 on the bottom of the crank disk, thereby to provide a dirt seal. Each disk has a downwardly extending axial shaft 45 formed with an upper tapered portion 46 fitting tightly within a tapered socket 47 in the upper portion of the gear hub and a lower splined portion 48 fitted within a bottom opening in the gear hub and engaging splines 49 for securing the shaft for rotation with the worm wheel. Thus the gathering head disks 6, 6 are supported by the worm wheels.

When the disk-shaft 45 of each disk is in assembled position, as shown in Fig. 4, a sleevelike nut 50 is threaded on the reduced lower end of the shaft and suitably engages at its upper end a snap ring supported within a groove in the walls of the bore of the gear hub. The outer cylindrical surface of this nut fits within the bottom bore in the gear hub. This nut, when tightened, draws the disk-shaft 45 tightly down in the bore of the gear hub, with the shaft taper 46 held firmly in the tapered hub socket 47, thereby to absorb all lever action between the shaft and gear. A washer 51, secured by screws to the lower end of the shaft 45, has lateral projections received in diametrically arranged slots in the nut to lock the nut in adjusted position to the shaft. A detachable cover plate 52, secured, as by screws, to the bottom of the gear casing, encloses the lower end of the shaft and bottom roller bearing in the manner shown.

When it is desired to dismantle one of the gathering head disks for any reason, the gathering head may be jacked up in a suitable manner to a substantially horizontal position and the bottom cover plate 52 may be removed. The locking washer 51 may then be detached by removing the screws from the shaft. The nut 50 may then be unthreaded from the lower end of the disk-shaft. The disk-shaft may then be driven upwardly to effect removal of the disk from its mounting on the worm wheel, without disturbing the bearing mounting for the worm wheel within the gear casing. In Fig. 6, the parts are shown partially dismantled with the bottom cover, the locking washer and screws, the nut, and the disk and disk-shaft removed from their cooperating parts on the gathering head. Conversely, the crank disk may be readily assembled on the gathering head by driving the disk-shaft downwardly within the gear hub, securing the shaft tightly in position by the nut, and thereafter placing the locking washer and bottom cover in position.

As a result of this invention, an improved material loading apparatus is provided, having improved driving means for the gathering mechanism whereby assembly and dismantling of the gathering mechanism are facilitated. It will also be evident that by mounting the gathering head disks on the driving gears, it is possible readily to remove the disks without disturbing the driving gears. It will further be evident that by journaling the driving gears within aligned bearings in the gear casings and mounting the disk-shafts directly within the gear hubs, the disk shafts may be readily removed from the gear hubs without disturbing the gears on their bearing mountings. Also, improved adjustment of the bearings is possible since they are carried by a single part instead of by separate movable parts as in previous known mechanisms. Other advantages of the invention will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In combination, a supporting frame having a transverse upper frame portion provided with an opening, a driven crank closely overlying said upper frame portion and having a projecting drive shaft secured thereto, said shaft extending downwardly through said opening, a driving gear disposed below said upper frame portion and journalled in said frame and having a socketed hub for receiving said shaft whereby said crank is solely supported and driven by said gear, and means engaging the lower end of said shaft and said gear for releasably securing said shaft to said gear and releasable to permit upward removal of said shaft from said socketed gear hub thereby to remove said crank from said frame without disturbing said gear on its journal in said frame.

2. In combination, a supporting frame having a transverse upper wall provided with an opening, a driven crank disk lying closely above said upper wall and having an upstanding crank pin, said disk having an axial shaft projecting from the bottom thereof downwardly through said wall opening, a driving gear for said disk arranged on said frame beneath said disk and said upper wall, said gear having a hub provided with a socket for receiving said shaft whereby said disk is solely supported and driven by said gear, bearings supported within said frame and in which said gear is journaled, one of said bearings supported below said upper wall near the upper end of said shaft, and means engaging the lower end of said shaft and said hub for securing said shaft in said hub socket and releasable to permit upward withdrawal of said shaft from said hub socket thereby to remove said crank disk from said frame without disturbing said gear on its bearing mounting in said frame.

3. In combination, a supporting frame having a transverse upper wall providing a plane top surface and having an opening, a disk lying substantially flush with the top surface of said upper wall of said frame and having an upstanding crank pin, said disk having an axial shaft projecting from the bottom thereof downwardly through said wall-opening, a gear casing secured to said upper wall of said frame beneath said disk, a driving gear journaled in bearings within said casing below said upper wall, and means engaging the lower end of said shaft and said gear for securing said shaft to said gear whereby said disk is supported solely by said gear, said securing means being releasable to permit removal of said shaft from said gear thereby to remove said disk from said frame without disturbing said gear on its bearing mounting in said casing.

4. In combination, a supporting frame having an upper transverse wall provided with an opening, a member to be driven lying closely above said upper wall, and driving means for said member including a drive shaft secured to said member and extending downwardly through said wall-opening, said shaft having an upper tapered portion and an axially spaced lower portion having splineways, a driving gear disposed below said upper wall, a casing housing said gear and secured to said upper wall, said casing supporting upper and lower bearings in which said gear is journaled, said gear having a tapered upper socket and a spaced axial lower bore having splines, said socket receiving said tapered shaft portion and said bore receiving said spaced shaft portion with the splines engaging said splineways, and means for securing said shaft to said gear whereby said member to be driven is solely supported by said gear, said securing means including means engaging the lower end of said shaft and said gear for tensioning said shaft to draw said tapered portion downwardly tightly into said tapered socket and releasable to permit removal of said shaft upwardly from said gear to remove said driven-member from said frame without disturbing said gear and its bearings in said casing.

5. In combination, a supporting frame having an upper transverse wall provided with an opening, a disk lying closely above said upper wall and having an upstanding crank pin, said disk having an axial shaft projecting downwardly therefrom through said wall-opening, a casing secured to said frame below said upper wall, a driving gear enclosed in said casing and having an elongated hub provided with a socket, upper and lower bearings supported within said casing and in which the end portions of said gear hub are journaled, said hub-socket receiving said shaft whereby said disk is solely supported by said gear, and releasable means for securing said shaft to said gear including means engaging the lower end of said shaft and said gear hub for tensioning said shaft to draw the latter tightly downwardly within said socket and releasable to permit upward removal of said shaft from said gear hub socket thereby to remove said disk from said frame without disturbing said gear and its bearings in said casing.

6. In combination, a supporting frame having a transverse upper wall provided with an opening, a crank member closely overlying said upper wall and having an upstanding crank pin, said crank member having a depending shaft projecting downwardly therefrom through said wall-opening, a casing secured to said frame beneath said upper wall, a driving gear in said casing below said upper wall, said gear having an elongated hollow hub, spaced upper and lower bearings supported in said casing and in which the end portions of said gear hub are journaled, said shaft being received in said hub whereby said crank member is supported solely by said gear, and releasable means engaging the lower end of said shaft and said gear hub for securing said shaft to said gear hub and releasable to permit upward removal of said shaft from said gear hub thereby to remove said crank member from said frame without disturbing said gear and its bearings in said casing.

7. In combination, a supporting frame having a transverse upper wall provided with an opening, a rotatable element to be driven closely overlying said upper wall, said rotatable element having a drive shaft extending downwardly through said wall-opening, a casing secured to said supporting frame below said upper wall, a gear in said casing and having a hollow hub, spaced upper and lower bearings supported within said casing and in which said gear hub is journaled, said shaft being received in said hollow hub whereby said rotatable element is solely supported by said gear, and releasable means engaging the lower end of said shaft and said gear hub for securing said shaft to said gear and releasable to permit upward withdrawal of said shaft from said hub thereby to remove said rotatable element from said frame without disturbing said gear and its bearings in said casing.

8. In combination, a supporting frame having a transverse upper wall provided with an opening, a driving element lying closely above said upper wall and having a depending shaft extending downwardly through said wall-opening and formed with an upper tapered portion, a gear disposed beneath said upper wall and having a tapered socket, upper and lower bearings supported within said frame and in which said gear is journaled, one of said bearings supported below said upper wall at the upper portion of said shaft, and means for securing said shaft to said gear whereby said driving element is supported solely by said gear, said securing means including means engaging the lower end of said shaft and said gear for tensioning said shaft to draw said tapered portion tightly downwardly within said socket and releasable to permit upward withdrawal of said shaft from said gear socket thereby to remove said driving element from said frame without disturbing the relation of said gear with respect to its bearings, while the latter remain supported within said frame.

9. In combination, in a mechanism for supporting and rotating in an orbit a driving pin, a member carrying a driving pin and means for supporting said member for rotation on an axis offset from the axis of said driving pin and for effecting rotation thereof on said axis, including a transverse frame portion closely underlying said member and a member arranged beneath said frame portion for supporting and driving said first mentioned member, said supporting and driving member having driving means therefor secured thereto between its ends and having spaced axially thereof combined radial and axial thrust bearings, said first member having extending at right angles to the planes of movement of said pin an element for connecting it to said second member and said second member having at its end nearer said first member a connection with said element operative on tightening thereof to absorb all of the lever action between said element and said second mentioned member, and means acting on the lower end of said element and on said second member below said connection for placing said element in axial tension to tighten said connection, said second member also having with said element at a point below said connection where said element is under axial tension only an interengaging connection for transmitting the rotation of the second member to said element.

10. In combination, in a mechanism for supporting and rotating a driving pin, a member carrying a driving pin, and means for supporting said member for rotation on an axis offset from the axis of said driving pin and for effecting rotation thereof on said axis, including a transverse upper frame portion closely underlying said member and a member underlying said upper frame portion for supporting and driving said first mentioned member having driving means therefor secured thereto between its ends and having spaced axially thereof combined radial and axial thrust bearings, said first member having extending at right angles to the planes of movement of said pin an element for connecting it to said second member and said second member having a wedging connection with said element including a tapered portion on one part received in a tapered socket in the other part and operative on tightening thereof to provide a tight wedging fit between the parts to absorb all of the lever action between said element and said second member, and means acting on said element and on said second member for placing said element in axial tension to draw said tapered portion downwardly into said tapered socket thereby to tighten said wedging connection, said second member also having with said element at a point where the latter is under tension only a splined connection for transmitting the rotation on said second member to said element.

11. In combination, a supporting frame having a transverse upper wall, a crank closely overlying said upper wall and having an upstanding crank pin and a crank shaft offset from said pin at the bottom of said crank and projecting downwardly therefrom below said upper wall, a driving member journaled in said frame beneath said crank and said upper wall, said member having a socket for receiving said projecting shaft whereby said crank is supported solely by said member, said socket having a tapered portion near its upper end and said shaft having a tapered portion receivable in said tapered socket portion, and said shaft having a splined portion near its lower end beneath its tapered portion and said socket having splineways below said tapered socket portion for receiving said splines whereby said shaft and said driving member are interlocked for rotation together, and an adjustable device between the lower end of said shaft and said member for placing said shaft in axial tension to secure said cooperating tapered portions in tight wedging relation to absorb all lever action between said shaft and said member, and said device being releasable to permit upward withdrawal of said shaft from said socket thereby to remove said crank from said frame without disturbing the mounting of said member on its journal in said frame.

12. In combination, a supporting frame having vertically spaced, upper and lower, transverse walls and a chamber between said walls, a crank lying closely above said upper wall and having an upstanding crank pin and a depending crank shaft offset from said pin at the bottom of said crank and projecting downwardly therefrom into said chamber, a driving member journaled in said frame and arranged in said chamber beneath said crank and said upper wall, said driving member having a socket for receiving said projecting crank shaft whereby said crank is supported solely by said driving member, combined radial and axial thrust bearings supported by said upper and lower frame walls and engaging said driving member at points spaced longitudinally thereof for journaling said driving member within said frame, said socket having a tapered portion near its upper end and said shaft having a tapered portion receivable in said tapered socket portion, and said shaft having a splined portion near its lower end beneath said tapered portion and said socket having splineways below said tapered socket portion for receiving said splines whereby said shaft and said driving member are interlocked for rotation together, and an adjustable device between the lower end of said shaft and said member for placing said shaft in tension to secure said cooperating tapered portions in tight wedging relation to absorb all lever action between said shaft and said member, and said device being releasable to permit upward withdrawal of said shaft from said socket thereby to remove said crank from said frame without disturbing the relation of said member with respect to said bearings and while said bearings remain supported by said frame walls.

WILLIAM E. OVERTURF.

REFERENCES CITED

The following references are of record in the file of this patent:

UNITED STATES PATENTS

| Number | Name | Date |
|---|---|---|
| 1,370,073 | Utz et al. | Mar. 1, 1921 |
| 1,407,568 | Page | Feb. 21, 1922 |
| 1,444,937 | Nogrady | Feb. 13, 1923 |
| 1,823,147 | Jewett et al. | Sept. 15, 1931 |
| 2,133,102 | Kuhns | Oct. 11, 1938 |
| 2,179,876 | Bones | Nov. 14, 1939 |
| 2,338,160 | Arentzen | Jan. 4, 1944 |

FOREIGN PATENTS

| Number | Country | Date |
|---|---|---|
| 740,132 | France | Jan. 21, 1933 |
| 674,799 | Germany | Apr. 22, 1939 |